United States Patent [19]

Dhingra

[11] 3,828,839

[45] Aug. 13, 1974

[54] PROCESS FOR PREPARING FIBER REINFORCED METAL COMPOSITE STRUCTURES

[75] Inventor: Ashok Kumar Dhingra, Claymont, Del.

[73] Assignee: E. I. du Pont de Nemours and Company, Wilmington, Del.

[22] Filed: Apr. 11, 1973

[21] Appl. No.: 350,128

[52] U.S. Cl. .................................................. 164/97
[51] Int. Cl. .......................................... B22d 19/02
[58] Field of Search ........ 164/97, 110, 112; 29/197, 29/197.5

[56] References Cited
UNITED STATES PATENTS

| | | | |
|---|---|---|---|
| 3,103,722 | 9/1963 | Whitehurst et al. | 164/97 X |
| 3,138,837 | 6/1964 | Weeton et al. | 29/471.1 |
| 3,473,900 | 10/1969 | Sara | 29/197 X |
| 3,529,655 | 9/1970 | Lawrence | 164/97 |
| 3,547,180 | 12/1970 | Cochran et al. | 164/97 X |
| 3,676,916 | 7/1972 | Schierding et al. | 29/419 |

*Primary Examiner*—J. Spencer Overholser
*Assistant Examiner*—John E. Roethel

[57] ABSTRACT

An economical process is disclosed for the preparation of strong composites of magnesium-containing metals reinforced with alumina-containing refractory oxide fibers. In the process alumina-containing fibers in a solid matrix of a soft, flexible organic polymer are loaded into a mold and the organic polymer is burned off. The remaining fibers are then aligned and uniformly distributed within the mold and the mold heated to about the temperature of the magnesium-containing metal to be used. Finally, the magnesium-containing metal is forced into the mold in a molten state by applying pressure. In this manner strong alumina fiber/magnesium-containing metal composites are formed which are useful as turbine blades, and structural beams and shafts, and the like.

13 Claims, No Drawings

PROCESS FOR PREPARING FIBER REINFORCED METAL COMPOSITE STRUCTURES

FIELD OF THE INVENTION

This invention relates to the preparation of metals reinforced with inorganic fibers. More specifically the invention is directed to a process for preparing magnesium-containing metals reinforced with continuous polycrystalline alumina-containing refractory oxide fibers by employing infiltration techniques.

BACKGROUND OF THE INVENTION

Ceramic, or refractory oxide, fibers in the form of whiskers are well known, as is their use in polymer matrices to reinforce or strengthen the polymer. In order to maximize the strength of the polymer, the whiskers should be aligned in parallel fashion and have their ends overlap.

The use of these same refractory oxide fibers to reinforce and strengthen metals has been considered and work has been carried out to prepare and test such metal-fiber composites. However, such work has generally been unsuccessful in economically producing strong metal-fiber composites of sufficient size for commercial applications. In general, the composites have been very difficult to make, limited in size and shape, and expensive. The compositions produced by the process of this invention are strong and can be structurally large.

Composite fabrication must be economical and at the same time several factors must be considered that affect the quality of the composite. If any one factor is adverse, the quality of the composite will be reduced. These factors include:

1. Fiber Orientation, Distribution and Volume Fraction Within the Metal Matrix

It has been difficult, expensive and time-consuming to obtain aligned, uniformly distributed fibers, and even more difficult to densely pack the fibers into the matrix to obtain high loading of fiber. Heretofore, no acceptable, i.e., reproducible at low cost, method of aligning, uniformly distributing and densely loading the fibers has been found. Frequently it is done by hand. Sometimes it is done by extruding a plasticized mixture of whiskers and through a thin slit, but this is relatively inefficient and results in many misaligned fibers. It would be advantageous to employ continuous filaments, but the commercially available large diameter continuous inorganic filaments, e.g., boron, are restricted to uses in composites of simple shape which do not require severe fiber bending. It is an object of the process of this invention to employ selected small diameter continuous filaments, in yarn form, which can easily and economically be aligned and uniformly dispersed in the metal matrix. In addition, it is important that high loading of fiber be achieved, for up to a certain limit, the higher the loading, the greater the strength of the composite. It is an object of this invention to provide a process whereby high loadings can be obtained without sacrificing other necessary requirements.

2. Oxidation, Breakage and Surface Damage of the Fibers

It has been difficult to prevent breakage of the fibers and damage of their surfaces. It is important to prevent such breakage and damage since broken fibers and surface flaws on the fibers weaken their strengthening characteristics. In addition, the common continuous filament inorganic fibers, carbon fibers and boron fibers, oxidize at high temperatures, causing a decrease in their strengthening characteristics. It is an object of this invention to provide a process which employs high temperature resistant aluminacontaining fibers in a manner which significantly reduces breakage and the creation of surface flaws.

3. The Degree of Porosity, Channeling, and Impurities Present in the Composite

Unless careful controls are employed in the formation of the metal-fiber composites, voids frequently form, or impurities are left, which result in a weak structure. In addition, channeling, a problem common to the infiltration techniques used to infiltrate the fibers with molten metal, causes uneven distribution of fibers within the matrix which results in a weak structure. It is an object of this invention to provide a process which substantially eliminates such voids, channels, and impurities. Removal of impurities is accomplished primarily by firing to clean the mold during the process and by employing clean, small-diameter fibers. Because of their small diameter, the fibers can be infiltrated with molten metal at high loading of the fibers by a flow akin to capillary action. This permits even, uniform infiltration that results in a matrix substantially free of voids, and substantially free of areas of pure metal matrix caused by the flowing of the molten metal in "channels" through the fibers.

4. Strength of the Bonding Between the Metal and the Fibers

The bonding between the metal and the fibers necessary for strength of the composite has been found heretofore to deteriorate generally on heating of the composite, resulting in a loss of properties. This may be due, in the instance of infiltration of fibers by molten metal, to the inability of the molten metal to wet the fibers sufficiently to cause good bonding between them. It is an object of this invention to provide a process in which good wetting and bonding occurs between the metal matrix and the fibers employed without deterioration of fiber properties.

SUMMARY OF THE INVENTION

This invention provides a process for preparing fiber reinforced metal composite structures which comprises in sequence:

A. placing into a mold a composite comprising a preform made from continuous filament polycrystalline refractory oxide fibers containing at least about 60 percent $Al_2O_3$ by weight and having a fiber diameter of between about 5 and about 50 microns, and a solid organic polymer which undergoes a substantial residue-free thermal decomposition at temperatures between about 300°C. and 800°C.;

B. removing the organic polymer by thermal decomposition or solvent extraction;

C. separating and uniformly distributing the fibers in the mold;

D. heating the mold to within ±75°C. of the melting point of the magnesium-containing metal to be used to infiltrate the fibers in the mold in step E;

E. infiltrating the fibers in the mold with molten magnesium-containing metal by forcing the molten metal into the mold by applying pressure; and F. cooling the mold.

DESCRIPTION OF THE INVENTION

The continuous filament polycrystalline refractory oxide fibers employed herein are high modulus, high strength fibers containing at least about 60 percent $Al_2O_3$ by weight and preferably at least about 95 percent $Al_2O_3$. Preferably also, the $Al_2O_3$ is predominantely in the form of alpha alumina. The tensile strength of the fibers is at least about 100,000 lbs./in.$^2$ (psi.) and is preferably at least about 200,000 psi. The modulus of the fibers is at least about $35 \times 10^6$ psi. and is preferably at least $50 \times 10^6$. The preparation of these fibers is known in the art, being described in British Patent No. 1,264,973. The fibers have a diameter of between about 5 and about 50 microns, preferably 15 to 25 microns. The fibers can be coated with a film of about 0.01 to about 1 micron thickness of vitrified silica to impart still greater strength to them. The fibers useful herein can consist solely of the 60 percent or more alumina-containing fibers described above, or they can be a mixture of such alumina-containing fibers with other refractory oxide fibers provided the alumina content of all the fibers is at least 60 percent by weight. Thus, the fibers can comprise refractory oxide systems such as $Al_2O_3$—$SiO_2$, $Al_2O_3$—$AlPO_4$, $Al_2O_3$—MgO, MgO, $ThO_2$, $ZrO_2$—CaO, $ZrO_2$—MgO, $ZrO_2$—$SiO_2$, $Cr_2O_3$, $Fe_2O_3$, NiO, CoO, $Ce_2O_3$, $HfO_2$, $TiO_2$, and the like. These fibers should have a melting point of at least 1,000°C. Preferably, the fibers will be employed in the form of yarns containing 50 or more of the continuous filament alumina-containing refractory oxide fibers.

Because of the high temperature stability of these fibers, they are more suited for use in metal-fiber composites than are boron or graphite fibers known in the art. In addition, because of their small diameter, these fibers lend themselves to fabrication of composites of more complex shapes than can be made with many art-described inorganic continuous filaments.

Preferably, the fibers should have a rough surface, i.e., have small protrusions or bumps on the surface characterized by a microscopic roughness height of between about 1100 A and 7000 A and a microscopic roughness period between about 4000 A and 15000 A. It is believed that the protrusions provide capillary spaces between "contacting" fibers for better infiltration and assist in bonding the fibers to the magnesium.

The organic polymer employed in the preform used in step A of the process of this invention is preferably one that is capable of forming a soft, flexible, integral film from a solution, dispersion or metal of the polymer. Organic polymers with such properties are obtained when the polymer has a glass transition temperature of about 20°C. or lower, is substantially amorphous, i.e., less than 10 percent of the polymer is crystalline, and has a modulus of elasticity less than about $0.1 \times 10^6$ psi. In addition, the polymer must undergo a substantially residue-free thermal decomposition at temperatures between about 300° and 800°C. Suitable such polymers include the acrylates, e.g., poly(alkyl acrylates), higher alkyl methacryaltes (e.g., $C_4$ to $C_{16}$), acrylamides, polyvinyl ethers, polyoxides such as polyethylene oxide, polysiloxanes, N-alkyl polyamides, and in general the polymers considered as elastomers such as rubber, polybutadiene, polyisobutylene, urethane rubbers, and the like. A wide range of copolymers can be used as well as polymers or copolymers containing a plasticizer, and these are encompassed by the term "organic polymer." Glass transition temperatures of organic polymers can be found in "Polymer Handbook" by Brandrupt and Immergut, published by Interscience Publishers of New York (1967) and in other literature. A preferred polymer, because it produces a soft, flexible film, yet is strong and easy to handle, is polyethylacrylate. Other useful polymers include thermoplastic polymers such as polyesters, polyamides polyepoxide, and polyhydrocarbons such as polystyrene.

The preform used in step A can conveniently be made by winding a yarn of the continuous filament alumina-containing polycrystalline inorganic oxide fibers on a rotating mandrel, or drum, in a direction substantially perpendicular to the axis of rotation of the mandrel to give one or several, e.g., two or three, layers of uniaxially aligned yarn; coating the yarn with a liquid of the organic polymer, e.g. a solution, dispersion emulsion or a melt; at least partially drying the coated yarn and repeating the winding, coating and drying steps until the desired thickness is obtained. The resulting preform will be in the form of a continuous sheet. Most conveniently, the organic polymer will be appled from a solvent for the polymer which will evaporate fairly easily at ambient temperatures. A preferred solvent is methyl ethyl ketone when polyethylacrylate is the organic polymer. A 5 percent solution of the polymer in the solvent is ordinarily employed. Alternatively, the yarn can be dipped into the liquid containing the organic polymer prior to winding.

The resulting preform is then cut from the mandrel and may be further dried. The coating is applied and drying carried out so as to produce a composite containing from about 15 to about 35 percent by volume of the fibers. The remainder of the composite will be comprised of the polymer, residual solvent and voids. In order to increase the volume percent of the fibers present, this composite can be compressed (hot or cold) to decrease the volume of the voids. Ordinarily, the pressing is accomplished by pressing with plates, or rolling along the axis of the aligned fibers with rollers, or by extruding the soft flexible composite along the axis of the fibers through a die using some of the original organic polymer coating solution as a lubricant. In this manner composites having a fiber content of 80 percent by volume can be obtained without excessive breakage of the fibers, but a content of not over 70 percent is preferred. This preform is flexible and handleable and affords a convenient means for placing the fibers in a mold in a densely packed, aligned, uniformly dispersed, highly loaded manner.

The preform can be consolidated if desired, e.g., by combining several layers and pressing them together or by extruding through a die. Whether consolidated or not, the preform is placed into a mold. The mold can be tubular to permit construction of shafts, pipes, springs and the like. or it can be shaped in various other configurations to permit construction of turbine blades, structural beams, cones, and a wide variety of other materials.

The phrase "tubular mld" is meant to include shapes that have a continuously hollow center and have cross-sections perpendicular to the tube axis which may be circular or non-circular (e.g., ellipses, squares, triangles, T-shaped, I-shaped, etc.).

For molds having a uniform cross-section along their length such as a cylindrical tube or shaft, the preform can be extruded to the dimensions of the mold and inserted into the mold using vacuum. For example, the mold will usually contain two openings, one for inserting the preform and the other ordinarily oppositely located in the mold, for applying a vacuum to the interior of the mold. Upon application of the vacuum, the preform can easily be drawn into the mold.

Molds having a nonuniform cross-section along their length can be constructed from two or more sections that fit together. Such open-sided, partial molds can be loaded, as by pressing, with preforms cut to the desired dimensions and the mold closed. The preforms used can be readily consolidated to the desired extent by rolling and/or pressing.

The mold filled with preform can be shaped, e.g., a tubular mold can be wrapped on a mandrel to give a spring shape.

The mold can be made of any material sufficiently refractory to survive the temperatures of infiltration, such as certain glasses, quartz, stainless steel, titanium, and the like.

By compressing the preforms as described, and by loading the molds as described, loading can be obtained in which the fibers occupy 80 percent by volume of the mold. Preferably, the mold will contain at least about 50 percent by volume of the fibers.

Once in the mold, the organic polymer matrix of the preform is removed, usually by heating the mold containing the preform in the presence of air in an oven at a temperature of from about 300° to 800°C. (preferably 400° to 600°C.). This is conveniently done using a closed oven with a positive pressure of air (e.g., 18 psi.) with one end (e.g., the infiltration end) of the mold open to the air and/or the other end connected to the outside atmosphere or a vacuum (e.g., 11 psi.).

The time required for complete combustion of the polymer will depend upon the amount and kind of polymer and the length of a mold. A thirty inch length of a 1-inch diameter preform containing about 60 volume percent of alumina fibers in polyethyl acrylate organic polymer is heated for about 3 hours at 500°C. and results in white fibers with all polymer removed.

If the polymer is not completely removed by heating, the mold can be flushed with a solvent for the polymer to remove any remainder, followed by removal of the solvent. Alternatively, the polymer can be removed by dissolution.

The mold is then cooled and vibrated in a vertical position to separate the fibers and distribute them uniformly within the mold. This can be accomplished by pressing the mold containing the fibers onto a Teflon disc attached to the vibrator. The frequency of the fibrator is adjusted so that the fibers in the mold vibrate at the critical frequency of vibration at which the amplitude of fiber vibration is maximum. By this means the fibers are uniformly distributed and separated inside the mold.

The mold containing the fibers is then fitted with a distribution plate, if desired, at the infiltration end to obtain uniform distribution of the metal. For example, a disc of graphite of about ⅛ to 1 inch thick containing a number of holes of 1/32 to ⅛ inch diameter fitted to the inside of the mold affords even distribution of molten magnesium-containing metal to the interior of the mold. It is preferred that such a plate be employed when the interior of the mold contains a cross-sectional dimension greater than 1 inch. The plate can be constructed of any suitable refractory ceramic or heat-resistant metal.

The mold is preferably evacuated to aid in avoiding the formation of voids in the final metal-fiber composite and the formation of channels of metal. This is conveniently done by infiltrating the molten metal into the infiltration connecting tube, cooling the tube to provide a seal and then evacuating the mold through an opening at the opposite end. The entire mold, including the interior under vacuum, is then heated, the metal seal melted and molten metal allowed to infiltrate the mold.

The temperature of the mold (and contents) and of the molten metal should be selected so that the equilibrium temperature of the infiltrated fibers is at least above the melting point of the metal.

The mold and its contents should be heated to within 75°C. of the melting point of the metal and preferably to about 25° to 75°C. above such melting point. The temperature of the molten metal can vary from near its melting point to about 150° to about 200°C. above the melting point. Excessively high temperatures should be avoided to reduce oxidation. With magnesium metal, heating temperatures of from bout 675°C. to 750°C. are preferred.

The longitudinal axis of a tubular mold can vary from near horizontal to vertical during infiltration depending upon the length of the mold. The use of a horizontal or near horizontal attitude affords better control of the temperature of the mold and reduces any tendency to distortion and buckling in addition to providing a lower pressure head of the molten metal.

The pressure on the molten metal should be somewhat in excess of that needed to overcome the resistance to flow caused by the mold and fibers and the pressure due to the head of the molten liquid in the mold; however, the use of excessive pressure can cause channeling in the mold. Pressures in the range of from about 2 to 14 pounds/square inch have been satisfactory. The pressure can be applied by a positive pump or by use of a properly controlled vacuum.

The term magnesium-containing metal includes not only the pure metal but mixtures and alloys containing at least 70 percent by weight of magnesium. For composites that are to be mechanically worked, alloys are preferred to pure magnesium.

The following examples illustrate the invention, but are not meant to be limiting with respect to it.

EXAMPLE I

The preparation of the preforms used in this invention is shown in this Example.

The refractory oxide fibers used consist of a yarn containing 60 continuous filaments of polycrystalline alumina having a diameter of about 20 microns with the predominant crystalline phase as detected by X-ray diffraction being alpha alumina. Such fibers have a tensile strength of about 180,000 psi. at 1 inch gauge and a Youngs modulus of about $50 \times 10^6$ psi.

Three ends of the above yarn are wound on a card winder (48 inches long by 2.25 inches thick with rounded ends) substantially perpendicular to the axis of rotation of the winder to provide two layers of yarn. The yarn on the winder is coated with about a 5 percent solution of polyethylacrylate in methylethyl ketone to provide about 3 percent polymer (based on total weight of fiber and polymer). The coated yarn is allowed to dry in the air for about 5 minutes. The winding, coating and drying sequence is repeated until a thickness of about 0.3 inch has been obtained. The resulting preform on the winder is cut and removed.

The preform is cut in the direction of the fiber length into strips of 0.9 inch width × 44 inches long and three strips placed together to form a structure of approximately square cross-section weighing about 750 grams. This is lightly coated with the polymer solution above and rolled into a circular cross-section with the axis of rotation parallel to the fiber axis. This structure is about 1.5 inches diameter. It is wrapped in a thin film of Teflon and consolidated by extruding through seven stages of dies (using the polymer solution as a lubricant) to yield a final consolidated preform of 0.7 inch diameter containing about 65 volume percent fibers.

The preforms are easily handled and stored, and can be molded into all manner of odd and normal shapes without fiber breakage.

The fibers used in this Example have a roughness height between 1100 A and 7000 A and a microscopic roughness period between about 4000 A and 15000 A.

The microscopic roughness height and period is obtained by measuring the height and spacing, relative to the adjacent fiber surface, of protrusions observed on a magnified silhouette of the longitudinal filament surface. The fibers are placed on copper grids using standard electron microscope procedures for viewing solid objects in transmission and photographed at 1500X or 2500X magnification. Photographic enlargements of the silhouettes are then made to obtain a final magnification of 6000X or greater. A straight edge is laid along the edge of the representative portion of the fiber surface, i.e., ignoring occasional atypical protuberances which may be due to dirt, in the micrograph so that fiber surface image equivalent to 90,000 A in the fiber (i.e., 54 mm. at 6000 X) lies adjacent the straight edge.

To obtain roughness period, the number of peaks in the 90,000 A equivalent length are counted, repeating this for three separate representative sections, and the values obtained are converted to roughness period expressed as average distance in A. between peaks. To obtain microscopic roughness height, a straight edge is placed on the same micrograph adjacent any representative surface equivalent to 50,000 A on the fiber so that the edge just touches at least the two tallest peaks. The maximum distance from the straight edge to the deepest valley in this section is measured. This is repeated three times on separate representative sections. The three numbers are averaged arithmetically and the average, expressed in A, is the microscopic roughness height.

EXAMPLE II

This example demonstrates the process of this invention.

The consolidated preform prepared in Example I is coated with the polyethylacrylate solution as a lubricant, and is drawn by vacuum into a quartz tube of 0.75 inch I.D. having an extended connecting tube (ca ½ inch × 20 inches) on one end. This mold containing the preform is placed in a closed furnace with the one end of the mole open to the open atmosphere and the connecting extended end connected to vacuum. Air at about 20 psi. is fed to the oven. The mold is heated under these conditions at 600°C. for 4 hours and cooled. The fibers are white. The white polycrystalline alumina fibers remaining are rinsed with acetone and dried. The fibers are separated and distributed uniformly in the mold by holding the mold in a vertical position against a vertical rod-type vibrator (Type EI made by A. G. Fur Chemie-Apparatebau Zurich). The open end of the mold is reduced in size and joined to a ¼ inch tube which is then bent at 90° to the mold axis.

The mold is placed in an electric furnace with the bent tube below the surface of a melt of commercial purity magnesium (ca 99.7 percent) at about 700°C. After heating the mold for 30 minutes sufficient magnesium is drawn by vacuum to fill part of the vertical feed tube and that tube chilled to freeze the magnesium. The mold and contents are then evacuated to about 750 mm. of Hg for 15 minutes to remove all gases. The entrance tube is then heated to melt the magnesium plug and a vacuum of about 500 mm. Hg used to infiltrate the fibers (heated to 700°C.) with the magnesium. The current to the electric furnace is shut off and the mold and contents cooled. The quartz mold breaks away from the composite on cooling. Metallographic examination of a cut cross-section does not show any porosity. The composite shaft with a density of about 0.105 lb./in.$^3$ has a distinct metallic sound when tapped with a metal bar. The resulting fiber reinforced magnesium composite is useful in applications such as aircraft structures where magnesium metal of high strength is desirable.

EXAMPLE III

This example shows the fabrication of a composite billet which is particularly suitable for mechanical working operations such a extrusion, rolling, forging, and the like.

The fibers used are polycrystalline alumina fibers of about 20 microns in diameter.

An initial preform of fibers and polymer is made as described in Example I. The preform is ¼ inch thick, 6 inches wide, weighs 1175 gms. and contains 50 volume percent loading of fibers in the preform. The preform is rolled in a spiral form along the axis of the fibers and packed in a cylindrical stainless steel mold, 3 inches ID, 3⅛ inches OD and 6 inches long. The organic binder is then burned off by heating the mold in a tube furance at 600°C. The small end of the mold is connected to vacuum so as to remove burnt polymer from the fibers. The fibers are white after complete removal of the binder.

A graphite distribution plate 3 inches D × ½ inch thick containing 90, ⅛ inch equally spaced holes is fitted to the open end of the mold using a ceramic cement. The mold is then preheated to about 700°C. in a tube furnace and infiltrated with molten magnesium at 750°C. using a vacuum of about 150 MM of Hg.

The billet is then allowed to cool in a vertical position to room temperature.

The dimensions of the finished billet are 3 inches D and 5 inches length, and a SS cladding thickness of about 1/16inch. The volume fraction of fibers in the billet is 50 percent. Polished crosssection of the billet shows a distinct spiral configuration, the alternate layers of fibers are separated by layers of matrix. This microstructure should be particularly suitable for mechanical working operations such as extrusion, rooling, etc. in order to form and shape end-use components.

EXAMPLE IV

A fiber reinforced magnesium composite made of the type shown in Example I containing about 50 volume percent of silica-coated alumina fibers has a density of 0.105 lb./in.$^3$, displays a specific flexural strength (ASTM D790-66) at room temperature, 600° and 800°F. of $14.5 \times 10^5$, $13.9 \times 10^5$ and $13 \times 10^5$ inches, respectively. The specific fluexural modulus under the same conditions are $3.1 \times 10^8$, $3.1 \times 10^8$ and $2.8 \times 10^8$ inches. In comparison the specific flexural strength of unreinforced magnesium is only $4 \times 10^5$ inches at room temperature and drops to about $1 \times 10^5$ inches at 600°F.; while the specific flexural modulus of unreinforced magnesium is only about $1.1 \times 10^8$ inches at room temperature.

The above fiber typically has a tensile strength of $2.5 \times 10^5$ psi. at 1 inch gauge length and a Youngs modulus of about $50 \times 10^6$ psi. The fibers have a roughness height and a roughness period within the ranges recited for the fibers used in Example I.

For certain applications the mold may be left on the composite as a sheath. In order to obtain good adhesion between mold and composite, the inside of the mold is abraded, etched or coated with a compatible alloy such as a brazing alloy. Thus, products made in metal molds such as stainless steel or titanium can be used as molded, e.g., as a turbine blade which requires high impact strength. The sheathed composites can be mechanically worked and the sheath then removed if desired. The fibers display a surprising resistance to breakage so that reductions of the alumina fiber/magnesium composite of as much as 85 percent in thickness by forging near the melting point of the magnesium still yield products having about 95 percent of the strength of the originals.

In addition to forging, such metal clad composites can be rolled, extruded, swaged, drawn, hydrostatically extruded, or hot isostatically pressed; the latter two being preferred. Preferably such operations are conducted at a temperature where part of the metal is in a liquid phase to obtain workability but there is sufficient solid metal to prevent misalignment and breakage of the fibers.

For example, a stainless steel clad composite can be heated in a furnace in argon atmosphere, removed and forged flat using a 500 lb. mechanical hammer with steel shims to control the thickness of the forged composite. Some samples can be rolled in a conventional rolling mill. The mechanical properties of the clad composites can be determined by the standard three-point flexural testing method using a crosshead speed of 0.05 inch/minute (test method reference ASTM D790-66).

The fiber lengths in the resulting composites can be determined by dissolving the steel sheath and magnesium matrix in a 0.5 inch sample in 20 percent HCl, washing the fibers with water, drying, dispersing in acetone, spreading on a slide, photographing at 200X and measuring. Alternatively, the lengths can be determined from metallographically polished sections mounted in plastic.

By these forging methods, reductions in thickness of fiber/magnesium cores of up to 85 percent may be obtained with no appreciable loss in flexural strength or modulus. At 85 percent reduction, some of the fibers may be broken, but they are still long enough to pick up 97 percent of the stress of a similar fiber of infinite length. At about 50 percent reduction, no fibers are broken when forging is carried out at a temperature near the melting point of the magnesium and is in a slushy state. Improved results would be obtained by cooling the ends of the sheathed composite so that the solid matrix metal serves as a plug for the interior slushy metal. The use of magnesium alloys with a longer range of liquid to solid temperatures would afford easier processing.

The forging detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A process for preparing fiber reinforced metal composite structures which comprises in sequence:
   A. placing into a mold a composite comprising a preform made from continuous filament polycrystalline refractory oxide fibers containing at least about 60 percent $Al_2O_3$ by weight and having a fiber diameter of between about 5 and about 50 microns, and a solid organic polymer which undergoes a substantially residuefree thermal decomposition at temperatures between about 300°C. and 800°C.;
   B. removing the organic polymer by thermal decomposition or solvent extraction;
   C. separating and uniformly distributing the fibers in the mold;
   D. heating the mold to within ± 75°C. of the melting point of the magnesium-containing metal to be used to infiltrate the fibers in the mold in step E;
   E. infiltrating the fibers in the mold with molten magnesium-containing metal by forcing the molten metal into the mold by applying pressure; and
   F. cooling the mold.

2. The process of claim 1 wherein, in step E the molten metal is forced into the mold through a heat-resistant plate containing a plurality of small uniformly spaced apertures.

3. The process of claim 1 wherein the solid organic polymer is substantially amorphous and has a glass transition temperature of about 200°C. or less, and a modulus of elasticity of less than $0.1 \times 10^6$ psi.

4. The process of claim 1 wherein in step E the molten metal is forced into the mold by evacuating the interior of the mold.

5. The process of claim 1 wherein the volume percent of fibers in the mold in step A is at least about 50 percent is less than about 80 percent.

6. The process of claim 1 wherein the $Al_2O_3$ in the fibers employed is predominately alpha alumina and the diameter of the fibers employed is between about 15 and about 25 microns.

7. The process of claim 6 wherein the fibers have a microscopic roughness height of between about 1100 A and about 7000 A and a microscopic roughness period of between about 4000 A and 15000 A.

8. The process of claim 6 wherein the fibers employed contain a coating of vitrified silica about 0.01 to about 1 micron thick.

9. The process of claim 6 wherein the solid organic polymer is substantially amorphous and has a glass transition temperature of about 20°C. or less, and a modulus of elasticity of less than $0.1 \times 10^6$ psi.

10. The process of claim 9 wherein the organic polymer employed is polyethyl acrylate.

11. The process of claim 9 wherein the $Al_2O_3$ content of the fibers employed is at least 95 percent by weight.

12. The process of claim 9 wherein in step E the molten metal is forced into the mold by evacuating the interior of the mold.

13. The process of claim 6 wherein the volume percent of fibers in the mold in step A is at least about 50 percent and is less than about 80 percent.

* * * * *